US012749816B2

(12) United States Patent
Tung et al.

(10) Patent No.: US 12,749,816 B2
(45) Date of Patent: Sep. 29, 2026

(54) DUAL BAND IFA WITH OVERLAPPING ELEMENTS

(71) Applicant: PLUME DESIGN, INC., Palo Alto, CA (US)

(72) Inventors: Arthur Tung, San Jose, CA (US); Miroslav Samardzija, Mountain View, CA (US); Yu Ching Chu, Hsinchu County (TW); Liem Hieu Dinh Vo, San Jose, CA (US)

(73) Assignee: PLUME DESIGN, INC., Palo Alto, CA (US)

( * ) Notice: Subject to any disclaimer, the term of this patent is extended or adjusted under 35 U.S.C. 154(b) by 77 days.

(21) Appl. No.: 18/659,063

(22) Filed: May 9, 2024

(65) Prior Publication Data

US 2025/0350037 A1 Nov. 13, 2025

(51) Int. Cl.

| | |
|---|---|
| ***H01Q 13/10*** | (2006.01) |
| ***H01Q 5/10*** | (2015.01) |
| ***H01Q 5/314*** | (2015.01) |

(52) U.S. Cl.

CPC ............... *H01Q 13/10* (2013.01); *H01Q 5/10* (2015.01); *H01Q 5/314* (2015.01)

(58) Field of Classification Search

CPC ........... H01Q 13/10; H01Q 5/10; H01Q 5/314

See application file for complete search history.

(56) References Cited

U.S. PATENT DOCUMENTS

| | | | | |
|---|---|---|---|---|
| 8,248,312 B2 * | 8/2012 | Guan | H01Q 5/371 | 343/702 |
| 2011/0006963 A1 * | 1/2011 | Tani | H01Q 9/0407 | 343/700 MS |

* cited by examiner

*Primary Examiner* — Dieu Hien T Duong

(74) *Attorney, Agent, or Firm* — Nicholas Martin; Greenberg Traurig, LLP

(57) ABSTRACT

An antenna for wireless devices is disclosed, featuring a dual band inverted F antenna (IFA). The dual band IFA antenna includes a low band arm as well as a high band arm projecting from the low band arm, both utilizing a shared feed to facilitate dual-band operation. The high band arm, meandered across one or more planes, overlaps the low band arm to induce capacitive coupling, tuning the antenna for specific frequency bandwidths. The meandered low band arm generates regions of strong and weak electric fields, with a vertical portion of the high band arm aligned with one of these regions for optimal tuning. This configuration allows the antenna to maintain a compact form factor while resonating at both the low and high band frequencies. In some embodiments, the antenna is constructed by cutting and/or bending a continuous electrically conductive material.

17 Claims, 14 Drawing Sheets

2.4 GHz Current Flow

8 GHz Current Flow

600

DUAL BAND IFA WITH OVERLAPPING ELEMENTS

FIELD OF THE DISCLOSURE

The present disclosure generally relates to antenna systems and methods. More particularly, the present disclosure relates to a meandered dual band Inverted-F Antenna (IFA) antenna with an integrated slot antenna for use in compact applications.

BACKGROUND

A conventional slot antenna includes a metal surface (a ground plate), usually a flat plate, with one or more holes or slots cut out. This plate and hole or slot is driven as an antenna by a driving frequency, the slot radiates electromagnetic waves in a way similar to a dipole antenna. A slot antenna can be considered as an inverse of a dipole antenna, as a dipole antenna includes a conductive linear element surrounded by free space, and a conventional slot antenna includes a linear slot of free space surrounded by a conductive plane. The shape and size of the slot, as well as the driving frequency, determine the radiation pattern and the bandwidth that the antenna is capable of producing. A slot antenna's advantages are its size, design simplicity, and convenient adaptation to mass production using either waveguide or Printed Circuit Board (PCB) technology. A requirement for a slot antenna is an infinitely sized ground plane (conductor) or large enough size compared to the wavelength (λ). A second requirement is that the slit/cut/slot is close to half-wavelength (λ/2) in length to enable radiation (resonance).

The Inverted-F Antenna (IFA) is known for its compact size and efficient radiation characteristics. An IFA typically includes a feed, a shorting pin, and a radiating arm, which can be configured in various ways to achieve desired operational frequencies and bandwidths. However, conventional IFAs often face challenges in achieving dual-band operation while maintaining a compact form factor. This is due to the need for separate radiating elements for each operational band, which can increase the overall size and complexity of the antenna. Furthermore, the interaction between these radiating elements can lead to unwanted parasitic effects, which can degrade the antenna's performance.

Various devices utilize antennas for wireless communication, such as wireless Access Points (APs), streaming media devices, laptops, tablets, and the like (collectively "wireless devices"). Further, the design trend for such devices is to make them more aesthetically pleasing and have more compact form factors. The length requirements for an antenna limits the number of slot antennas and/or IFA antennas implemented into such devices, thus introducing an obstacle in designing antenna units for compact devices.

BRIEF SUMMARY OF THE DISCLOSURE

In some embodiments, the present disclosure relates to an antenna complement ring that includes one or more dual band IFA antennas and/or one or more slot antennas within a wireless device. In some embodiments, an antenna is coupled to various components within a wireless device, e.g., heat spreaders, Printed Circuit Board (PCB) Vias, etc. In some embodiments, the slot antenna also includes various additional slot antenna complement components. In some embodiments, the slot antenna of the present disclosure is meandered as to reduce its overall footprint inside of the wireless device while maintaining the required effective length for the desired output wavelength, thus allowing for more slot antennas to be placed in the wireless device. The term "meandered" is not meant to necessarily indicate a slot antenna or dual band IFA antenna is curved, but rather that has resonate components located in multiple planes, which may include horizontal planes relative to a heat spreader and/or ground. That is, the compact slot antenna can have a length that extends to a height and then to another length, to another height, etc. Also, the relative terminology here is meant in a logical sense since length and height are all relative as the corresponding wireless device can be moved.

In some embodiments, a slot antenna and/or dual band IFA antenna includes one or more meandered slots with dimensions that are less than one quarter of each desired output wavelength. In some embodiments, the slot antenna parameter is formed by the coupling of a plurality of components in a wireless device, where the total effective length of a slot is about one quarter of the desired output wavelength. In some embodiments, the slot includes an open end and a closed end, and the slot is wide enough as to allow the slot antenna to have a wide bandwidth. In some embodiments, the slot is configured to have a frequency range of 5 GHz to 6 GHz, or 6 GHz to 7 GHz for a WiFi 6E band, as non-limiting examples. In some embodiments, a secondary slot is configured to cover a different frequency, such as or 8 to 9 GHz, and is fed by the same source as the primary antenna, thus broadening the bandwidth. An elongated portion and a flange allows the slot antenna to be fed directly from a printed circuit board (PCB). In some embodiments, the slot antenna may further include components mounted within the slot, the effects of having components mounted within the slot being compensated by adjusting dimensions of the slot and adjusting the location of the feeding point of the slot antenna. The slot antenna may further include one or more air steps or ground steps to tune the slot antenna according to some embodiments.

One or more antennas may comprise a plurality of slots formed by its geometry. Each slot comprises of an open end and a closed end, where each slot is wide enough as to allow the slot antenna to have a wide bandwidth and/or impart a change in current flow to obtain induction characteristics. In some embodiments, the slot antenna includes a first slot configured for a first frequency and includes a secondary slot configured to cover a different frequency, and fed by the same source as the first slot, thus broadening the bandwidth. In some embodiments, one or more antennas described herein include one or more elongated portions and flanges, allowing the one or more slot antennas to be fed directly from a printed circuit board (PCB), for example. In some embodiments, one or more antennas described herein include one or more air steps or ground steps to tune the antenna.

In some embodiments, the present disclosure is directed to a dual band inverted F antenna (IFA) featuring a unique configuration that allows for dual-band operation within a compact form factor. The dual band IFA antenna includes a low band arm and a high band arm, with the high band arm projecting from the low band arm and sharing a common feed, promoting efficient use of space and resources within the wireless device. In some embodiments, the high band arm is meandered, and in some embodiments, it overlaps the low band arm along one or more horizontal planes. This overlapping is configured to induce capacitive coupling between the arms, which enables tunning for resonance at specific bandwidths. In some embodiments, the low band arm is also meandered, creating strong and weak electric field regions that are strategically utilized by aligning the high band arm to either the strongest or weakest electric field region, depending on the desired characteristics. The meandered structures of the high and low band arms facilitate a compact antenna design that resonates at both low band and high band frequencies. In some embodiments, the dual band IFA antenna includes one or more slot antennas, the features of which are described with regard to FIGS. 1-14.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
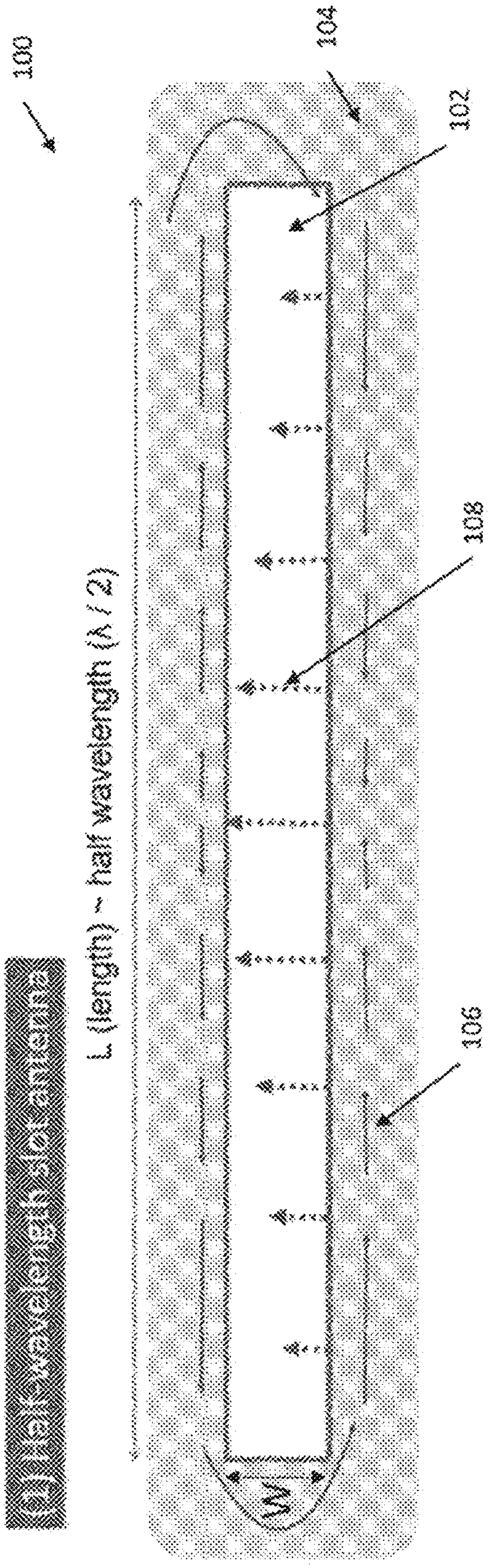
FIG. 1 is a diagram of a half-wavelength slot antenna according to some embodiments of the present disclosure.

In various embodiments, the present disclosure relates to a slot antenna and/or dual band IFA antenna in a compact wireless device. The slot antenna, which may be formed from part of the dual band IFA antenna, and vice versa, is constructed using various components already included in the wireless device, e.g., heat spreaders, Printed Circuit Board (PCB) Vias, etc. The slot antenna also includes various additional slot antenna complement components. In some embodiments, the slot antenna of the present disclosure is meandered as to reduce its overall footprint inside of the wireless device while maintaining the required effective length for the desired output wavelength, thus allowing for more slot antennas to be placed in the wireless device. The term "meandered" is not meant to necessarily indicate the slot antenna or dual band IFA antenna is curved, but rather that it is located in multiple planes. That is, a slot antenna and/or dual band IFA antenna can have a length that extends to a height and then to another length, to another height, etc. Also, the relative terminology here is meant in a logical sense since length and height are all relative as the corresponding wireless device can be moved.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of some embodiments in whole or in part, such as forming a slot antenna and a dual band IFA antenna in the same structure.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As used herein, "can" or "may" or derivations there of (e.g., the system "can" transmit signal X) are used for descriptive purposes only and is understood to be synonymous and/or interchangeable with "configured to" (e.g., the system is "configured to" transmit signal X) when defining the metes and bounds of the system. The phrase "configured to" also denotes the step of configuring a structure or computer to execute an algorithmic step according to some embodiments.

In some embodiments, a wireless device with a slot antenna includes one or more heat spreaders, a PCB with vias to allow current to flow through the PCB, various components described herein disposed on the PCB, and an antenna complement ring comprising one or more antennas described herein. By layering the components, e.g., heat spreaders, PCB, slot antenna complement, etc. one or more slot antennas are formed from these components as to integrate the slot antennas into the existing structure. The formed slot antenna is a meandered shape as to reduce the overall footprint of the slot antenna while keeping the required quarter-wavelength total effective length of an open-slot antenna. The formed slot antenna is wide enough to allow the antenna to accommodate a wide bandwidth and may include a plurality of steps to further allow for tuning of the length of the slot antenna. The wireless device can further include a housing enclosing the internal components.

FIG. 1 is a diagram of a half-wavelength slot antenna according to some embodiments. The slot antenna 100 includes a slot 102 who's length L is about half (λ/2) of the of the wavelength λ, and a ground plane 104 which is large relative to the wavelength λ of interest. The slot 102 includes a width W which is much less than the wavelength λ and much less than the length L of the slot 102. An electric current 106 is shown traveling around the perimeter of the slot 102 and an electric field 108 is shown flowing across the slot 102. The electric current 106 is much stronger along the ends of the slot 102 and depicted by longer arrows, and the electric current 106 is considerably weaker towards the center of the slot 102 and represented by the shorter electric current 106 arrows. Inversely, the electric field 108 creates most of the radiation and is much stronger in the center of the slot 102 and much weaker towards the ends of the slot 102. The slot antenna 100 shown in FIG. 1 is a half-wavelength slot antenna and takes up a considerable amount of space inside of a wireless device as there is a requirement for the extension of the length L in a single plane.

Figure 2:
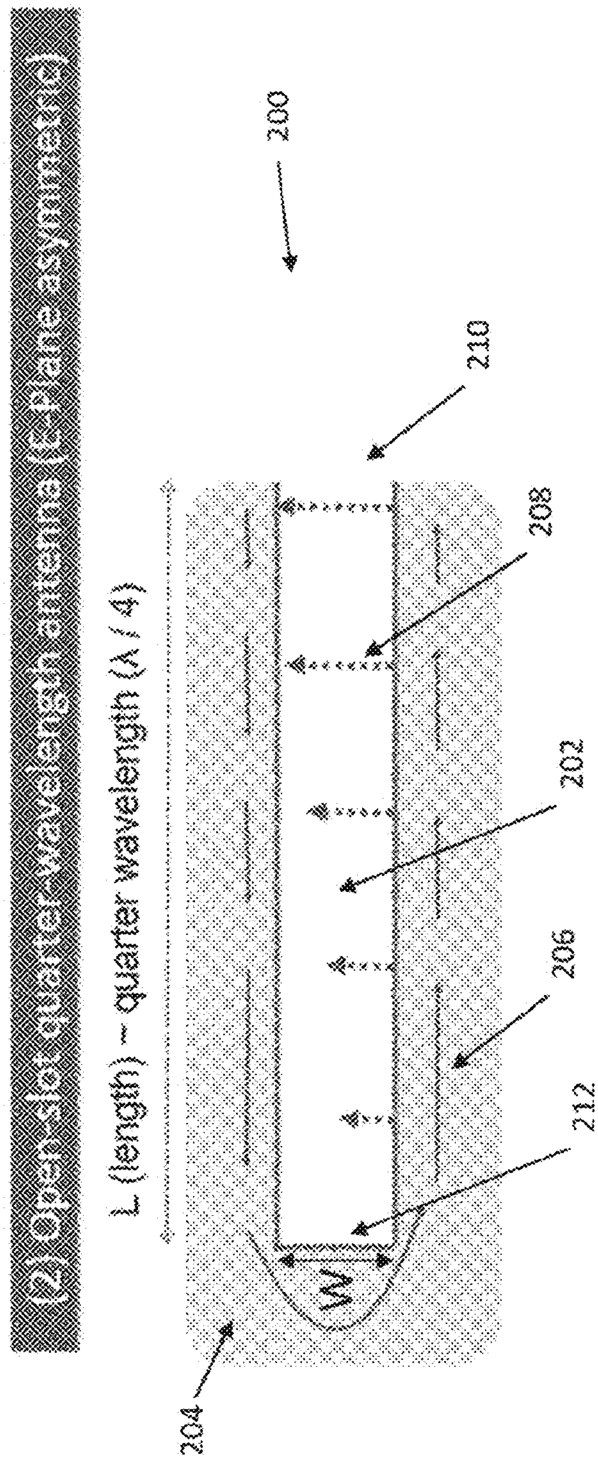
FIG. 2 is a diagram of an open-slot quarter-wavelength slot antenna according to some embodiments of the present disclosure.

FIG. 2 is a diagram of an open-slot quarter-wavelength slot antenna. The slot antenna 200 includes a slot 202 whose length L is about a quarter (λ/4) of the wavelength λ, and a ground plane 204 which is again large relative to the wavelength λ of interest. The slot 202 includes a width W which is much less than the wavelength λ and much less than the length L of the slot 202. The open-slot quarter-wavelength slot antenna includes an open end 210. Due to symmetry, the open-slot antenna can have a length L that is one quarter of the wavelength λ and still maintain similar performance. An electric current 206 is again shown traveling around the perimeter of the slot 202 and an electric field 208 is shown flowing across the slot 202. The electric current 206 is much stronger along the closed end 212 (shorting end) of the slot 202 and depicted by longer arrows, and the electric current 206 is considerably weaker towards the open end 210 of the slot 202 and represented by the shorter electric current 206 arrows. Inversely, the electric field 208 creates most of the radiation and is much stronger at the open end 210 of the slot 202 and much weaker towards the closed end 212 of the slot 202. The slot antenna 200 shown in FIG. 2 is a open-slot quarter-wavelength slot antenna and still takes up a considerable amount of space inside of a wireless device.

Figure 3:
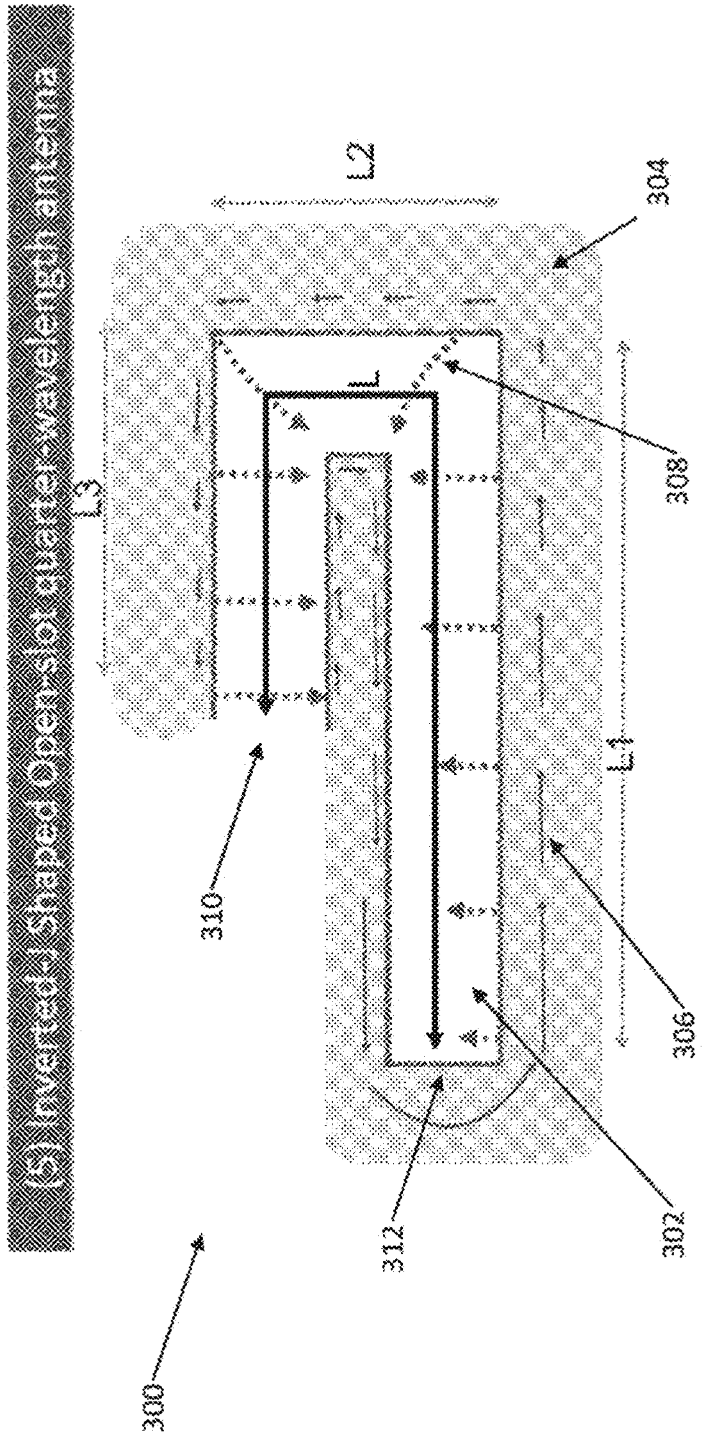
FIG. 3 is a diagram of a meandered open-slot quarter-wavelength slot antenna according to some embodiments of the present disclosure.

FIG. 3 is a diagram of a meandered open-slot quarter-wavelength slot antenna. This slot antenna 300 includes a slot 302 that is bent over itself in a meandered manner, again showing the slot 302 being located in multiple planes and having a plurality of lengths which make up a total length L. It will be appreciated that the plurality of lengths L may extend in any direction and any plane as to create a continuous slot 302. The total length L of the slot 302 of the meandered open-slot antenna is about a quarter of the wavelength λ as it was for the non-meandered open-slot antenna of FIG. 2.

Because of the slot being meandered, the overall length of the antenna is much smaller than a conventional open-slot antenna, thus taking up much less space inside of a wireless device. A ground plane 304, which is again large relative to the wavelength λ of interest, is disposed around the slot 302. The slot 302 includes a length L (i.e., total effective length) which is the sum of all lengths (L1, L2, and L3) and a width W which is much less than the wavelength λ and much less than the length L of the slot 302. Again, the lengths (L1, L2, and L3) may extend in any direction and in any plane, creating any configuration. It will also be appreciated that any number of lengths (L1, . . . , Ln) may be used to create the slot 302.

The meandered open-slot quarter-wavelength slot antenna includes an open end 310. Due to symmetry, the open-slot antenna can have a total length L that is one quarter of the wavelength λ and still maintain similar performance of a conventional half-wavelength slot antenna. An electric current 306 is again shown traveling around the perimeter of the slot 302 and an electric field 308 is shown flowing across the slot 302. The electric current 306 is much stronger along the closed end 312 (shorting end) of the slot 302 and depicted by longer arrows, and the electric current 306 is considerably weaker towards the open end 310 of the slot 302 and represented by the shorter arrows. Inversely, the electric field 308 creates most of the radiation and is much stronger at the open end 310 of the slot 302 and much weaker towards the closed end 312 of the slot 302. Because the total effective length L of the open slot antenna 300 is still one quarter of the wavelength λ, and the slot is meandered over itself, the overall footprint of the meandered open-slot antenna is much smaller than a conventional open-slot antenna. This allows more of these antennas to be placed in a wireless device while maintaining a small form factor. This type of electric field is also produced in the low band arm meander $M_{LB}$ of the dual band IFA antenna 600 described in relation to FIGS. 19-27.

Figure 4:
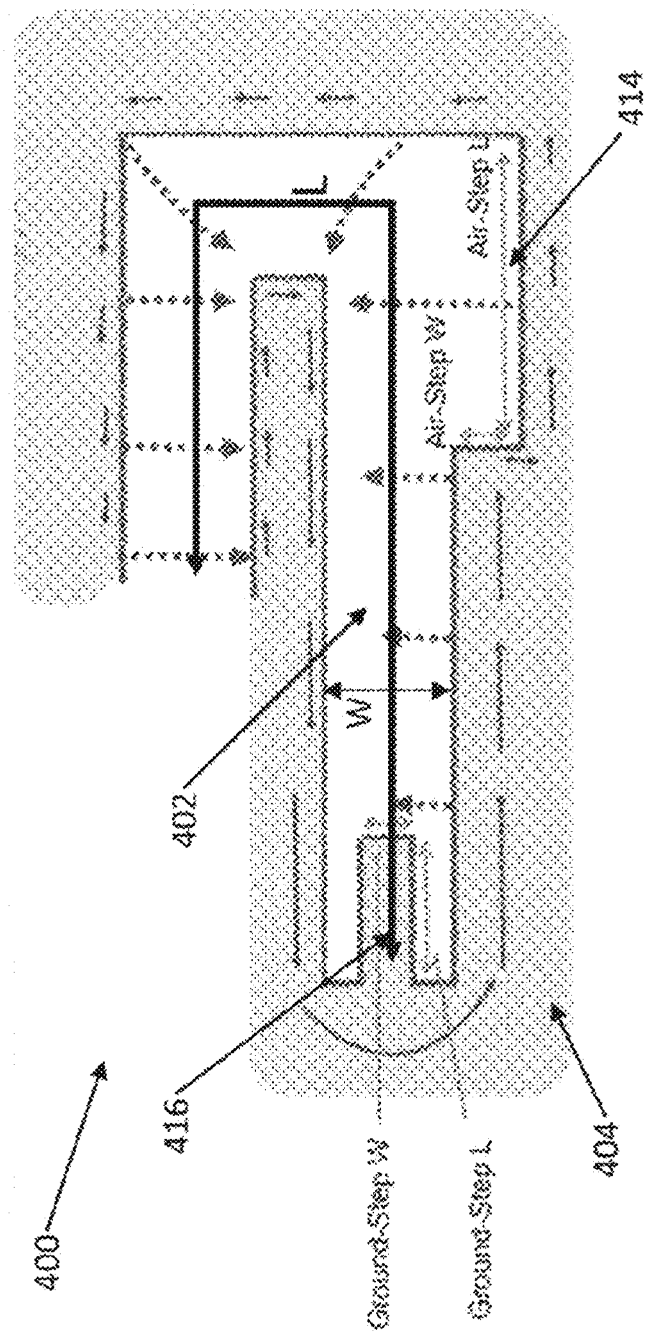
FIG. 4 is a diagram of a meandered open-slot quarter-wavelength slot antenna with a plurality of steps according to some embodiments of the present disclosure.

FIG. 4 is a diagram of a meandered open-slot quarter-wavelength slot antenna with a plurality of steps according to some embodiments. The meandered open-slot antenna 400 includes a plurality of steps, the steps being air-steps 414 and ground-steps 416. These steps are introduced to allow the slot antenna 400 to be tuned, thus tuning the resonance of the antenna 400. When these steps are introduced, they change the effective length L and/or width W of the antenna 400 and in turn change the radiating characteristics of the antenna 400. An air-step is characterized by an extra cut out section in the slot 402, increasing the effective length L and/or width W of the slot. A ground-step is an extension of the ground plane 404 protruding into the slot 402, decreasing the effective length L and/or width W of the slot 402.

Figure 5:
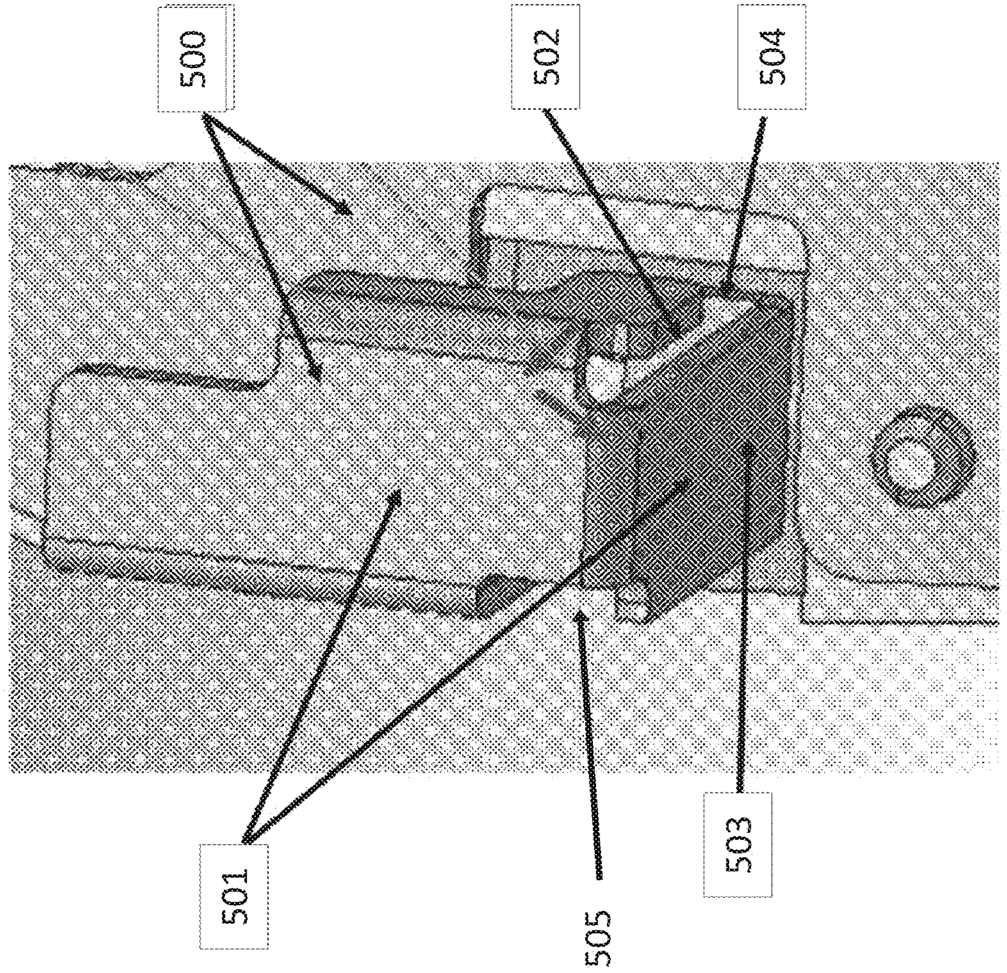
FIG. 5 is a top perspective diagram of an antenna complement ring comprising a slot antenna and/or dual band IFA antenna of the present disclosure according to some embodiments of the present disclosure.

FIG. 5 is a top perspective diagram of a slot antenna 500 in accordance with some embodiments of the present disclosure. In some embodiments, ground planes 501 may be in plane with the slot of the antenna or bent. In some embodiments, a secondary slot 502 is formed by the various bent portions of the ground planes 501. In some embodiments, the secondary slot 502 can be fed through the same elongated portion 503 and flange 504 used by the slot antenna 500. The secondary slot 502 may be a different length than the primary slot 505 thus allowing additional frequencies to be radiated or bandwidth tuning to be achieved.

Figure 6:
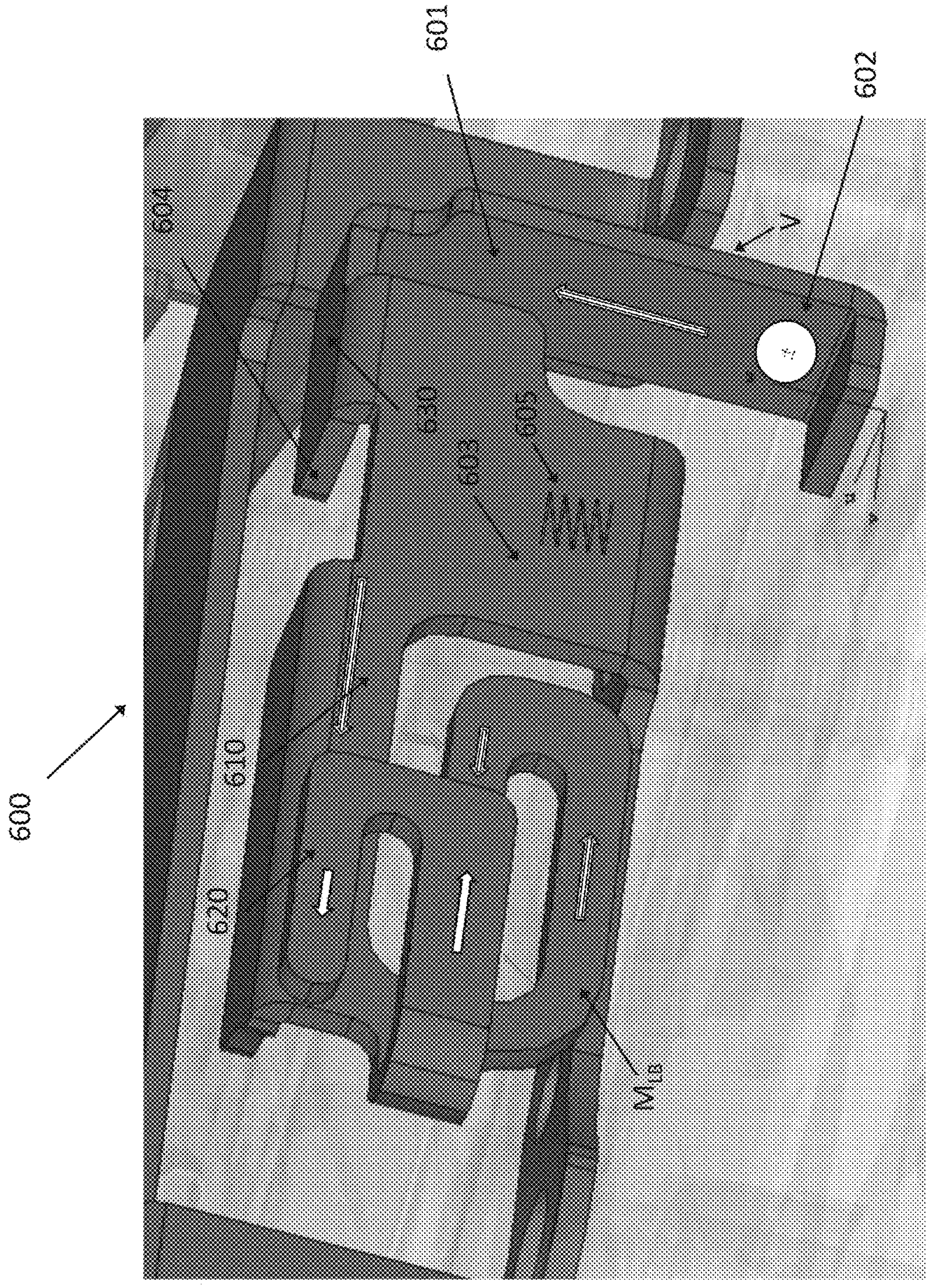
FIG. 6 illustrates a modification to the slot antenna shown in FIG. 5 to include a dual band inverted F antenna (IFA) according to some embodiments of the present disclosure.

FIG. 6 illustrates a modification to the slot antenna shown in FIG. 5 to include a dual band inverted F antenna (IFA) 600 according to some embodiments. Various modifications can be made to the antennas described herein for bandwidth tunning and or additional frequency resonance. For example, similar to FIG. 5, the dual band IFA antenna 600 of FIG. 6 has first slot 601 forming a slot antenna as previously described. However, the dual band IFA antenna 600 of FIG.

6 includes an IFA shape in this non-limiting example, including a feed 602, a shorting pin 603, a low band arm 610, and/or a high band arm 620. In some embodiments, the dual band IFA antenna 600 further includes a ground plane 630. Tuning methods, such as the introduction of the secondary slot 604 and/or adding a meander $M_{LB}$ to the low band arm 610 causes changes in electric fields and current flows within the dual band IFA antenna 600 to emulate an inductor 605, countering unwanted parasitic capacitance between the low band arm and surrounding structures, enabling an even more compact form factor.

Figure 7:
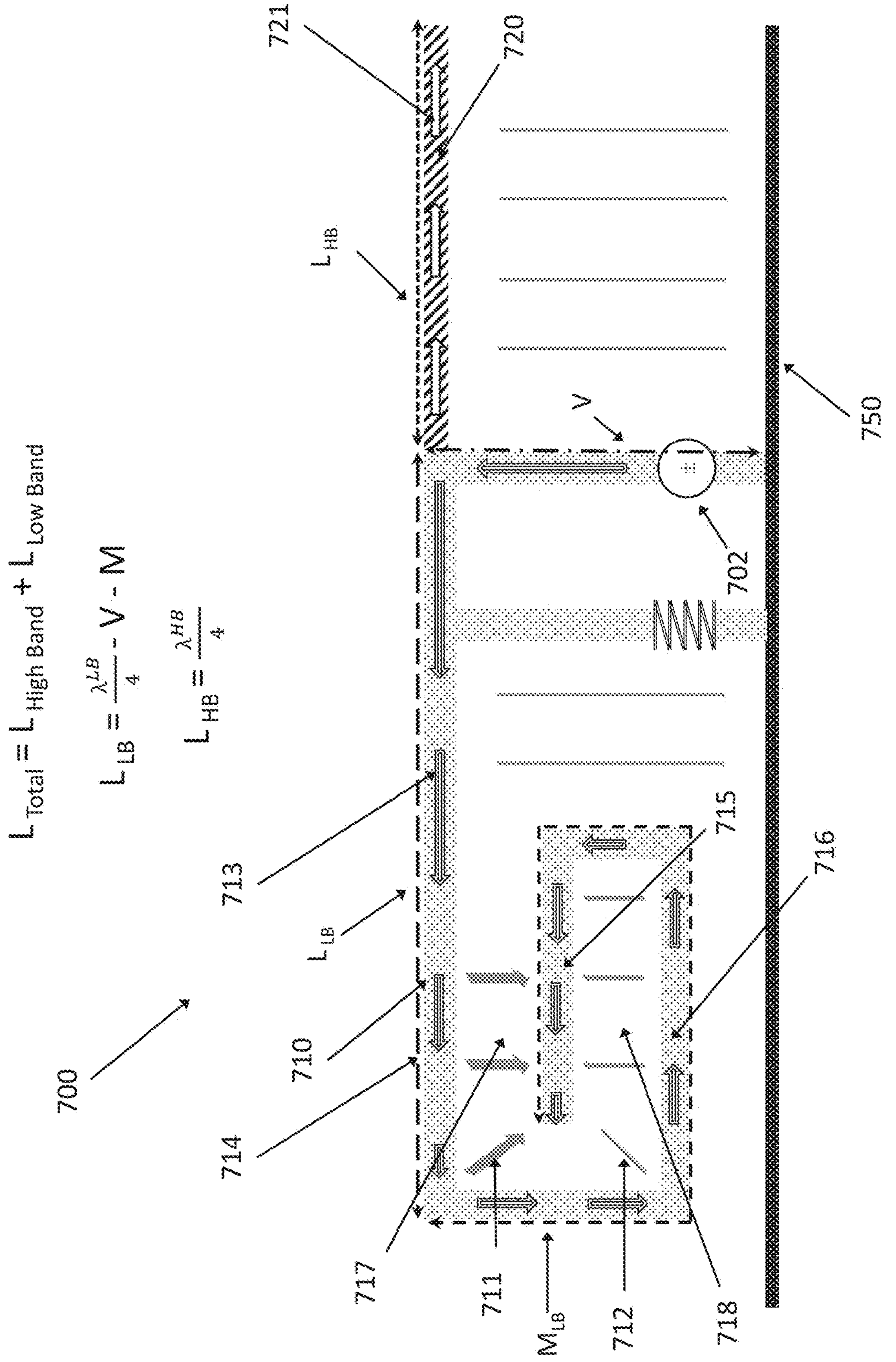
FIG. 7 shows a simplified wiring diagram for a dual band IFA antenna according to some embodiments of the present disclosure.

FIG. 7 shows a simplified wiring diagram for a dual band antenna 700 according to some embodiments. The length $L_{LB}$ of the low band arm 710, defined by a horizontal plane extending into the page, would normally include the length of the vertical portion V and the length of meander M, which makes up its effective length. However, the meander $M_{LB}$, along with the induction properties integrated into the configuration, shorten the length $L_{LB}$ to less than the effective length, similar to the slot antenna meandering example described in FIG. 3.

In some embodiments, the shape of the meander M on the low band arm 710 is configured to generate a strong electric field 711 in a strongest electric field region 717 and a weak electric field 712 in a weakest electric field region 718 as a result of the LB current flow 713 in the LB arm 710. In some embodiments, the strong electric field 712 is formed between a top current carrying portion 714 (relative to ground 750), and a middle current carrying portion 715. In some embodiments, the weak electric field 712 is formed between the middle current carrying portion 715 and a bottom current carrying portion 716.

In some embodiments, the dual band IFA antenna 700 includes a high band arm 720 and HB current flow 721 extending away from the feed 702 and the low band arm 710 as shown in FIG. 7. This additional high band arm 720 may be tuned to receive/radiate frequencies in the 5-9 GHz range, where the low band arm may be tuned between 1-5 GHz according to some embodiments. However, such ranges are not limiting as these ranges can be broadened on either end to the point of overlap or greater to achieve a desirable radiation characteristic. While functional, this high band arm length $L_{HB}$ adds to the total length $L_{Total}$ which may not be feasible in some device form factors.

Figure 8:
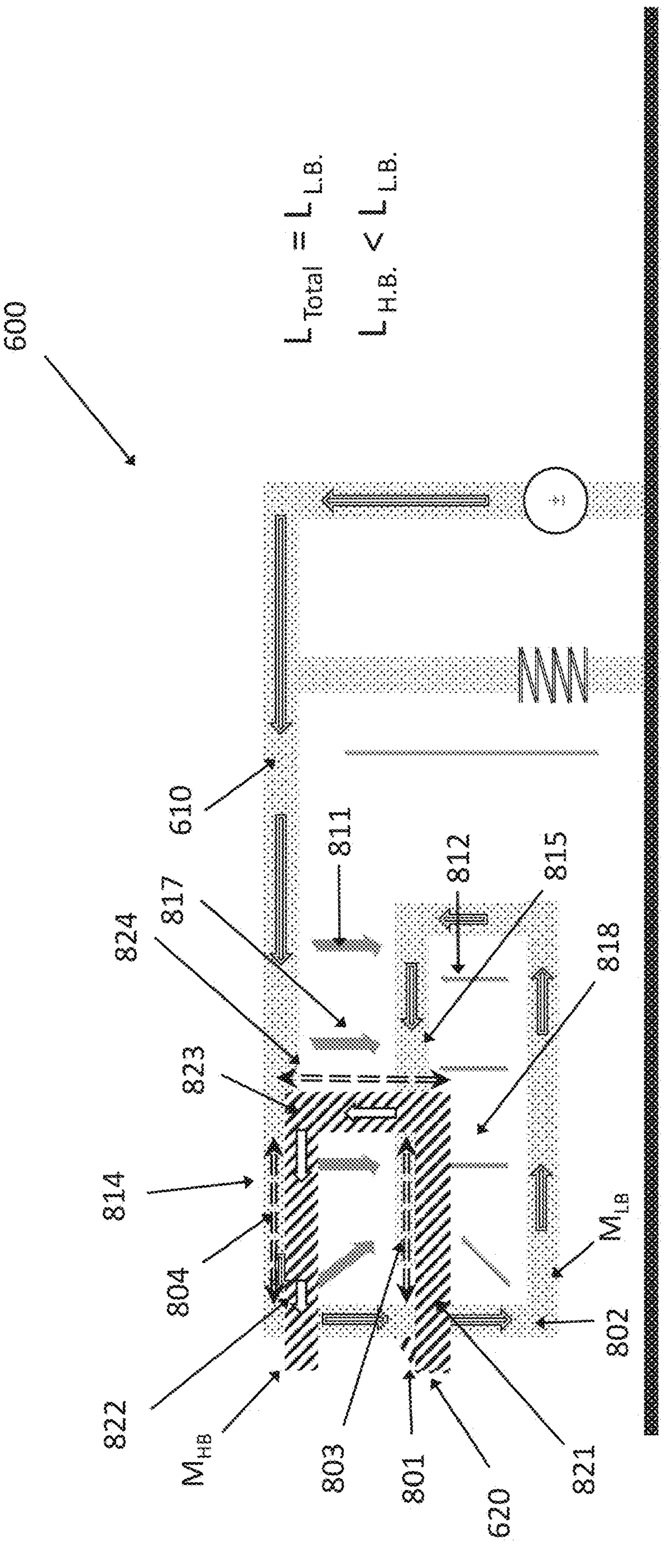
FIG. 8 shows a simplified diagram of FIG. 6 according to some embodiments of the present disclosure.

FIG. 8 shows a simplified diagram of FIG. 6 according to some embodiments. In some embodiments, the high band arm 620 is formed as a high band (HB) projection 801 from the low band (LB) arm 610. In some embodiments, the high band arm 620 includes a high band projection 801 extending from a vertical portion 802 of the low band arm meander $M_{LB}$. In some embodiments, the high band arm 620 is meandered. In some embodiments, the high band projection 801 is configured such that the meander of the high band arm $M_{HB}$ and the meander of the low band arm $M_{LB}$ overlap along a horizontal plane 803. In some embodiments, high band projection 801 is configured such that the meander of the high band arm and the meander of the low band arm overlap along more than one horizontal plane 803, 804. In some embodiments, the high band projection 801 is configured such that the meander of the high band arm and the meander of the low band arm are positioned to induce capacitive coupling between them. In some embodiments, the high band arm 620 is positioned such that a lower current carrying portion 821 of the high band meander $M_{HB}$ overlaps a middle current carrying portion 815 of the low band meander $M_{LB}$ along a horizontal plane 803. In some embodiments, the high band arm 620 is positioned such that a top current carrying portion 814 of the low band meander $M_{LB}$ overlaps an upper current carrying portion 822 of the high band arm in a horizontal plane 804.

In some embodiments, the meander in the dual band IFA antenna generates a strong electrical field 811 between the space between a LB top horizontal arm and LB middle horizontal arm, similar to FIG. 3, and is referred to herein as a strongest electric field region 817. In some embodiments, the middle horizontal arm includes an end of the low band arm. In some embodiments, a weak electrical field 812 is created between the LB middle horizontal arm and LB bottom horizontal arm, also referred to herein as a weakest electric field region 818, similar to FIG. 7. In some embodiments, the high band arm 620 is positioned such that a vertical portion 823 of the high band meander $M_{HB}$ is substantially (±) 5° aligned 824 with the strongest electric field region 817. This arrangement results in an antenna that has a total length $L_{Total}$ equal to the low band length $L_{LB}$ and a high band length $L_{HB}$ that is less than the $L_{LB}$ length.

Figure 9:
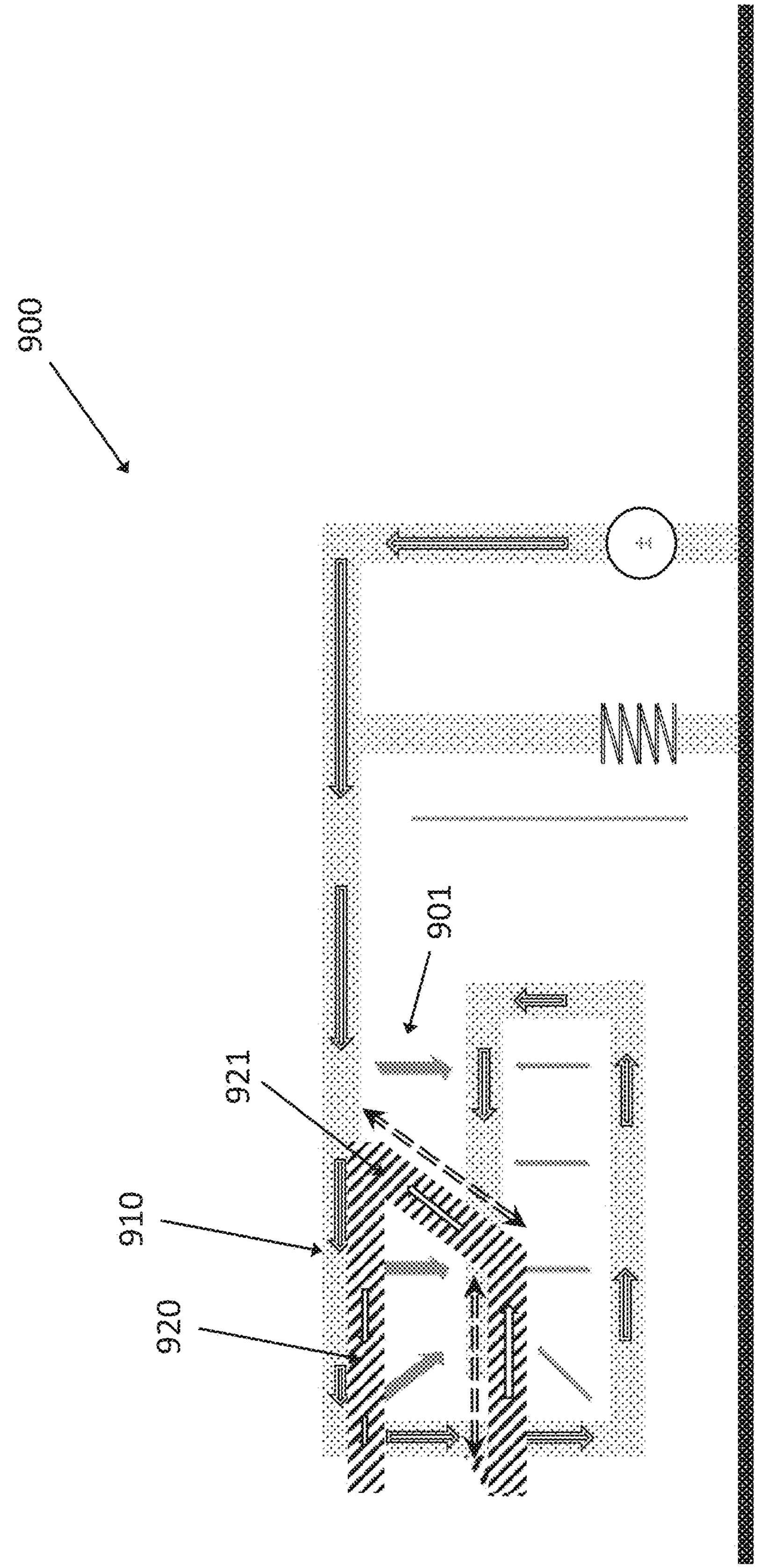
FIG. 9 shows a dual band IFA antenna with an angled HB vertical portion according to some embodiments of the present disclosure.

FIG. 9 shows a dual band IFA antenna 900 with an angled HB vertical portion 921 according to some embodiments. In some embodiments, the vertical portion 921 of the high band antenna 920 extends at an angle (e.g., 85%>angle>5%) to a direction of the electric field alignment 901 (strong and/or weak) formed by the meander of the low band arm 910. In some embodiments, angling the vertical portion 921 changes the interaction with the electric field, resulting in the ability to tune radiation characteristics of the high band antenna.

Figure 10:
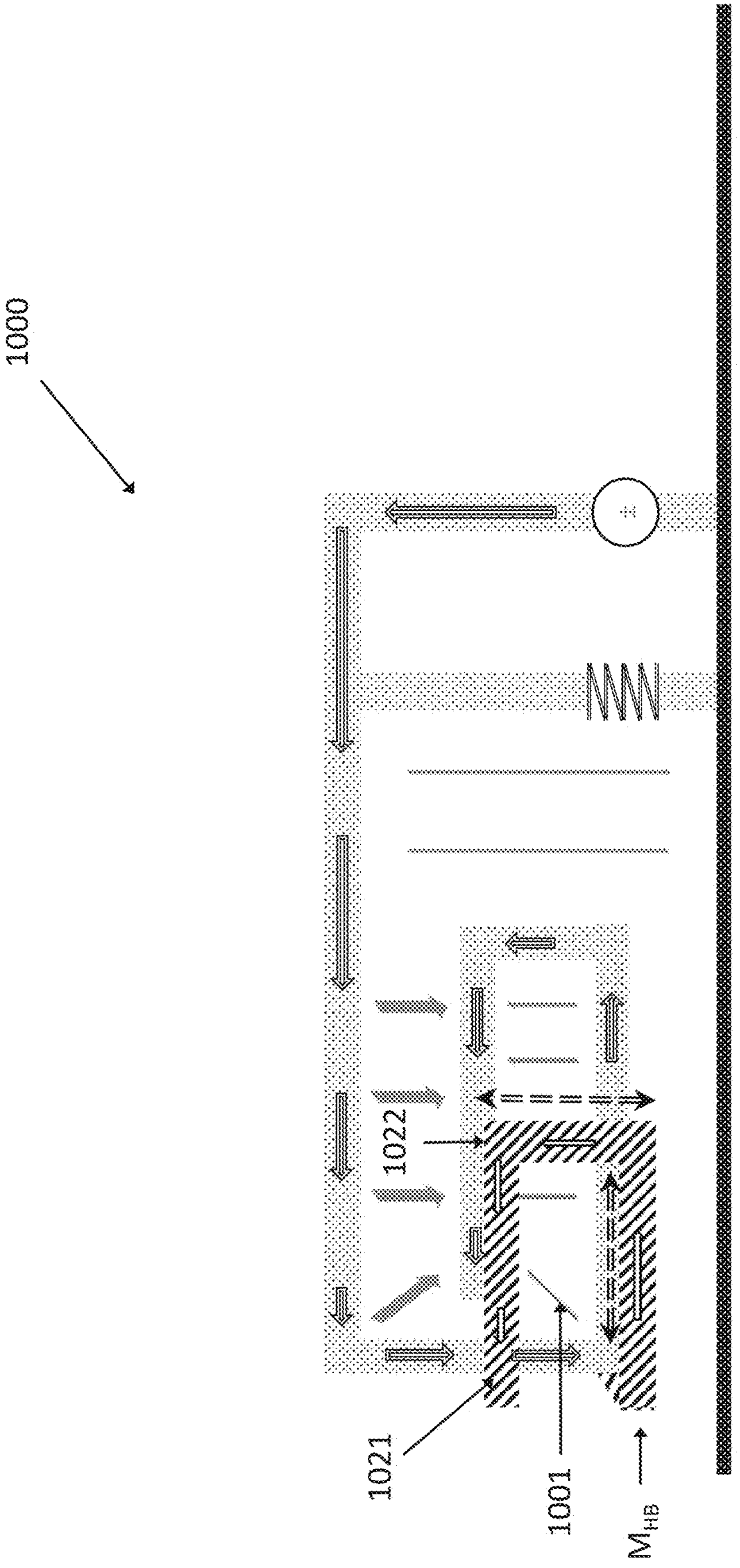
FIG. 10 shows the high band upper current carrying portion substantially aligned with weak electric field in a dual band IFA antenna according to some embodiments of the present disclosure.

FIG. 10 shows the vertical portion 1022 of the high band meander $M_{HB}$ substantially aligned with weak electric field 1001 in a dual band IFA antenna 1000 accordance with some embodiments. In some embodiments, substantially aligning the vertical portion 1022 of the high band meander $M_{HB}$ with the weak electric field 1001 enables the ability to tune radiation characteristics of the high band antenna.

Figure 11:
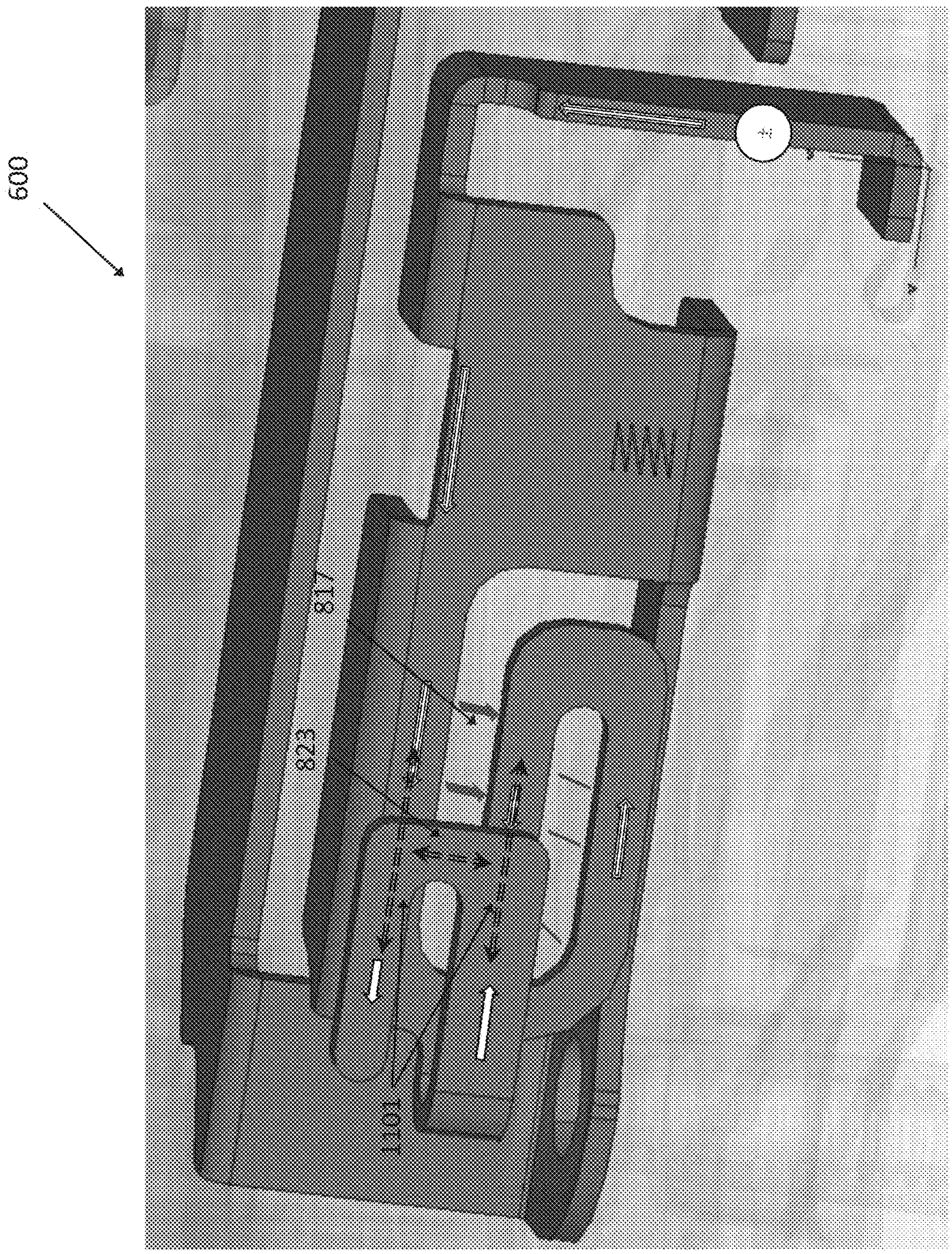
FIG. 11 illustrates the alignment of the horizontal portions of the LB and HB meander arms of FIG. 6 with current flow through each, as well as the vertical portion 823 of the HB aligned with strongest electric field region according to some embodiments of the present disclosure.
Figure 12:
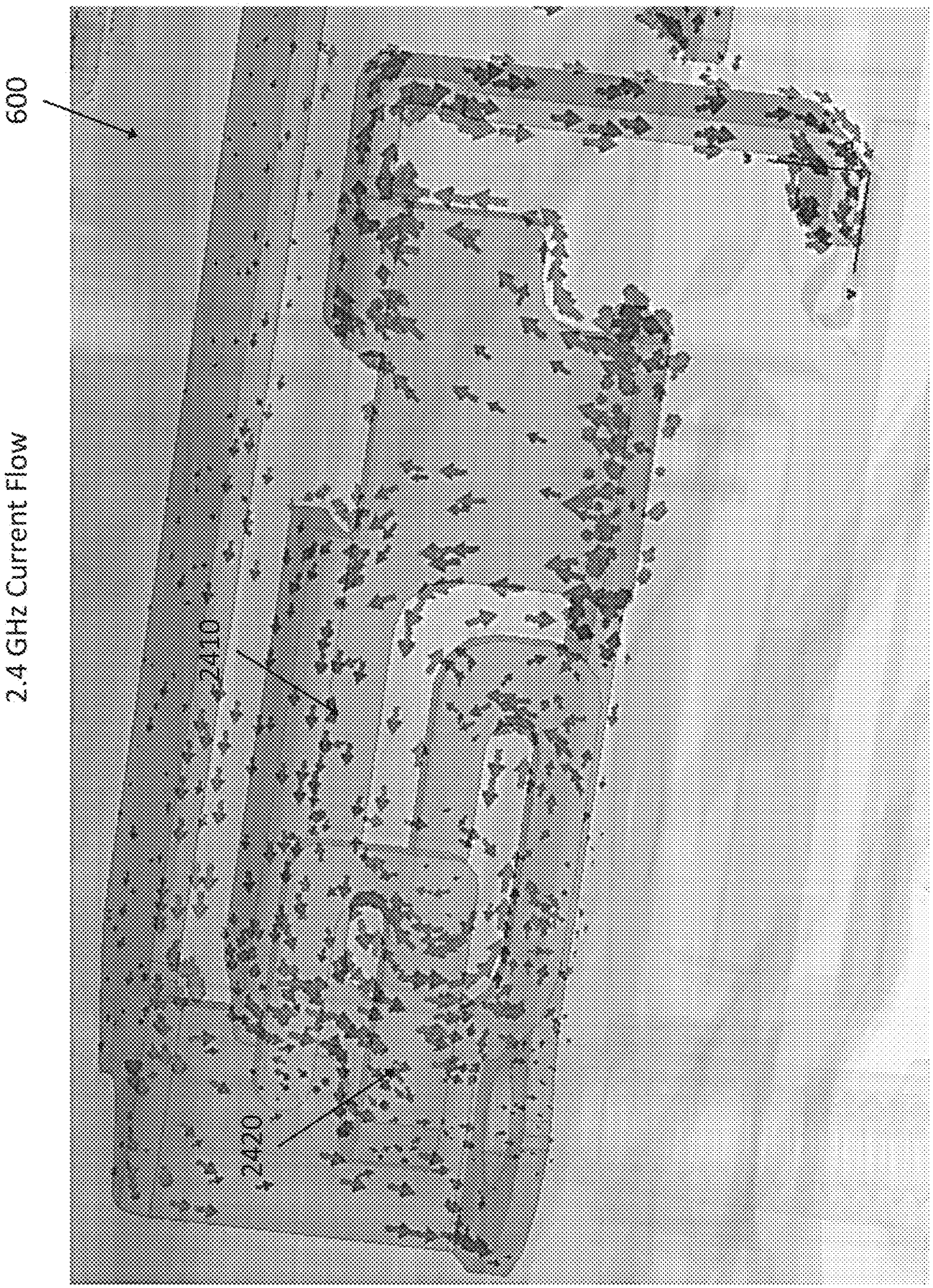
FIG. 12 depicts current flow through the dual band IFA antenna for a 2.4 GHz current flow according to some embodiments of the present disclosure.
Figure 13:
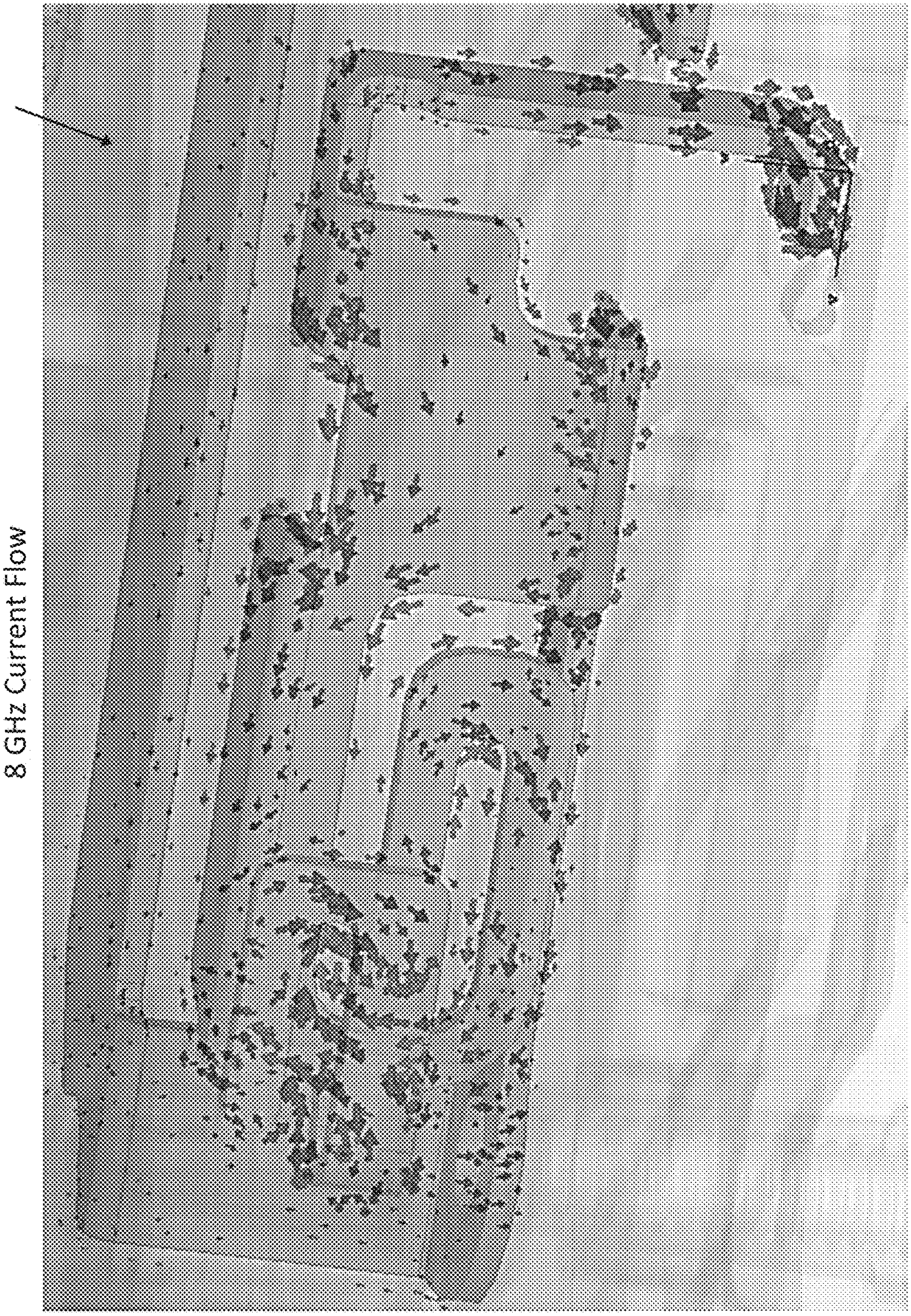
FIG. 13 shows current flow the dual band IFA antenna at an 8 GHz frequencies according to some embodiments of the present disclosure.

FIG. 11 illustrates the alignment 1101 of the horizontal portions of the LB and HB meander arms of FIG. 6 with current flow through each, and the vertical portion 823 of the HB meander aligned with strongest electric field 817 region in accordance with some embodiments. In some embodiments, the strongest electric field is adjacent the end of the low band arm meander middle current carrying portion. In some embodiments, the alignment 1101 of the horizontal portions for the $M_{LB}$ and $M_{HB}$ are configured to add constructively in radiation. FIG. 12 depicts current flow through the dual band IFA antenna for a 2.4 GHz signal according to some embodiments. As shown in FIG. 12, the current flow dominates the low band arm 2410 at 2.4 GHz. FIG. 13 shows current flow the dual band IFA antenna at an 8 GHz frequency in accordance with some embodiments. In some embodiments, at 8 GHz current flow is most dominate in the meandered HB arm 2420 of the dual band IFA antenna.

Figure 14:
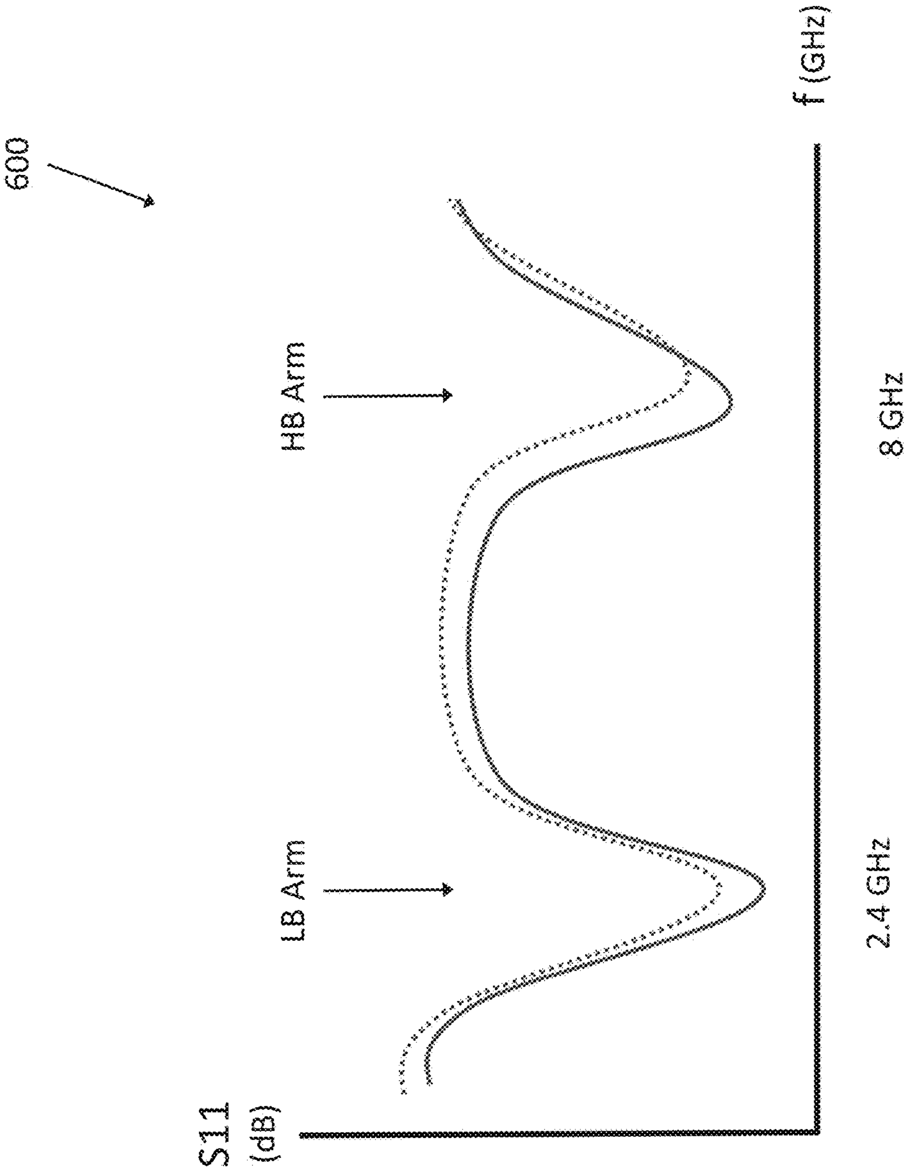
FIG. 14 shows an S11 plot showing the impedance characteristics and frequency response of the dual band IFA antenna of FIG. 6 across a range of frequencies according to some embodiments of the present disclosure.

FIG. 13 shows an S11 plot (reflection coefficient plot) showing resonance frequencies received at a single feed of the meandered IFA antenna. FIG. 14 shows an S11 plot showing the impedance characteristics and frequency response of the dual band IFA antenna across a range of frequencies. In some embodiments, the dual band IFA antenna resonates in the 2.4 GHz region for the low band and 8 GHz for the high band in this non-limiting example.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

What is claimed is:

1. An antenna comprising:

a feed, a shorting pin, a ground plane, a low band arm, and a high band arm, wherein the high band arm projects from the low band arm, wherein the high band arm is meandered to form a high band meander, wherein the low band arm is meandered to form a low band meander, wherein the low band meander comprises three current carrying portions parallel to each other, wherein a top current carrying portion and a middle current carrying portion are configured to generate a strongest electric field, wherein the middle current carrying portion and a bottom current carrying portion are configured to generate a weakest electric field, and wherein the strongest electric field is stronger than the weakest electric field in an area of the low band meander.

2. The antenna of claim 1, wherein the high band arm and the low band arm both share the feed.

3. The antenna of claim 1, wherein at least a portion the high band arm is configured to overlap at least a portion of the low band arm along a same horizontal plane.

4. The antenna of claim 3, wherein the at least a portion of the high band arm is configured and arranged to form a capacitance coupling with the at least a portion of the low band arm.

5. The antenna of claim 4, wherein the capacitance coupling is configured to tune the antenna for one or more frequencies.

6. The antenna of claim 4, wherein the capacitance coupling is configured to tune the high band arm for resonance at a bandwidth.

7. The antenna of claim 3, further comprising a slot configured to alter current flow along the low band arm.

8. The antenna of claim 7, wherein the altered current flow is configured to impart induction characteristics to the antenna.

9. The antenna of claim 7, wherein the low band arm is configured to resonate at a frequency between 1 GHz and 4 GHz.

10. The antenna of claim 9, wherein the high band arm is configured to resonate at a frequency between 5 GHz and 9 GHz.

11. The antenna of claim 1, wherein the low band meander comprises two current carrying portions parallel to each other; and wherein the two parallel current carrying portions are configured to generate an electric field.

12. The antenna of claim 11, wherein a vertical portion of the high band meander is substantially aligned with the electric field of the two parallel current carrying portions.

13. The antenna of claim 11, wherein a vertical portion of the high band meander is aligned in parallel with the electric field generated between the two current carrying portions of the low band meander.

14. The antenna of claim 1, wherein a vertical portion of the high band meander is substantially aligned with the strongest electric field of the low band meander.

15. The antenna of claim 1, wherein a vertical portion of the high band meander is substantially aligned with the weakest electric field of the low band meander.

16. The antenna of claim 1, further comprising a slot configured to resonate at a frequency.

17. The antenna of claim 16, wherein the shorting pin forms at least part of the slot.

* * * * *